United States Patent [19]
Kelly

[11] Patent Number: 5,108,854
[45] Date of Patent: Apr. 28, 1992

[54] BATTERY WITH SEPARATE ELECTROLYTE STORAGE TANK

[75] Inventor: Michael S. Kelly, Redlands, Calif.

[73] Assignee: The United States of America as represented by the Secretary of the Air Force, Washington, D.C.

[21] Appl. No.: 649,396

[22] Filed: Feb. 1, 1991

[51] Int. Cl.[5] ............................................. H01M 6/30
[52] U.S. Cl. .................................... 429/118; 429/116; 429/110
[58] Field of Search ................. 429/118, 110, 116, 113

[56] References Cited

U.S. PATENT DOCUMENTS

| | | | |
|---|---|---|---|
| 3,103,452 | 9/1963 | Comanor et al. | 429/110 X |
| 3,246,801 | 4/1966 | De Boer | 429/118 X |
| 3,434,884 | 3/1969 | Amiet | 429/110 X |
| 3,619,298 | 11/1971 | Jamm et al. | 429/116 |
| 4,404,267 | 9/1983 | Iacovangelo et al. | 429/41 |
| 4,448,857 | 5/1984 | Iacovangelo | 429/41 |
| 4,500,566 | 2/1985 | Karas et al. | 427/115 |
| 4,507,262 | 3/1985 | Karas et al. | 419/2 |
| 4,514,474 | 4/1985 | Mamyer et al. | 429/27 |
| 4,543,303 | 9/1985 | Dantowitz et al. | 429/34 |
| 4,565,749 | 1/1986 | van Ommering et al. | 429/27 |
| 4,642,275 | 2/1987 | Smith et al. | 429/52 |

Primary Examiner—Anthony Skapars
Attorney, Agent, or Firm—Thomas C. Stover; Donald J. Singer

[57] ABSTRACT

A battery cell of extended shelf life, which has a separate electrolyte storage tank having screened outlet ports, which tank is mounted within another container to define an annulus therebetween, which annulus defines a passageway to a screened outlet port and thence to a battery cell, is provided. The screens are of fine mesh size which pass electrolyte therethrough but due to the surface tension of the electrolyte entrained therein, block the passage of gas therethrough and thus separate the two. Such battery is dormant until the electrolyte is expelled from the storage tank through the annulus, through the conduit and into the battery. In an improvement, such electrolyte is expelled by charging pressurized gas to the storage tank which expels the electrolyte through the tank barrier screens to the annulus, through the outlet port barrier screens to such battery cell while retaining the pressurized gas in the storage tank and perhaps a small amount of such gas behind the outlet port barrier screens to thus exclude the passage of gas into such battery cell, which gas can impair the operation thereof. The pressure drop across such screens is controlled or held below a certain level to stop or minimize gas bubble penetration through such screens.

11 Claims, 4 Drawing Sheets

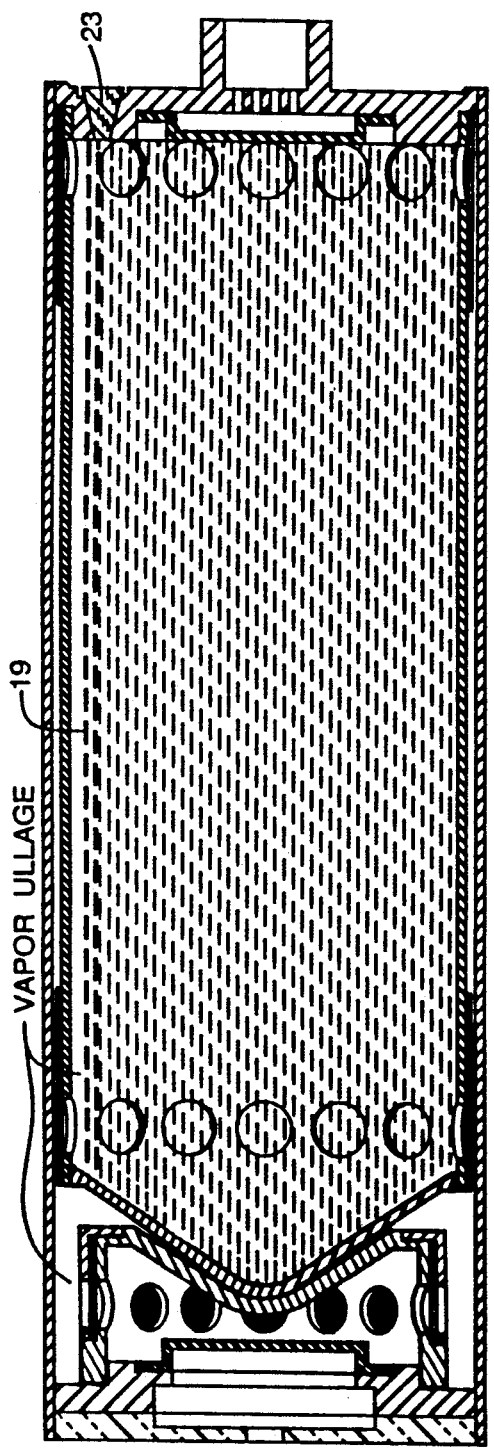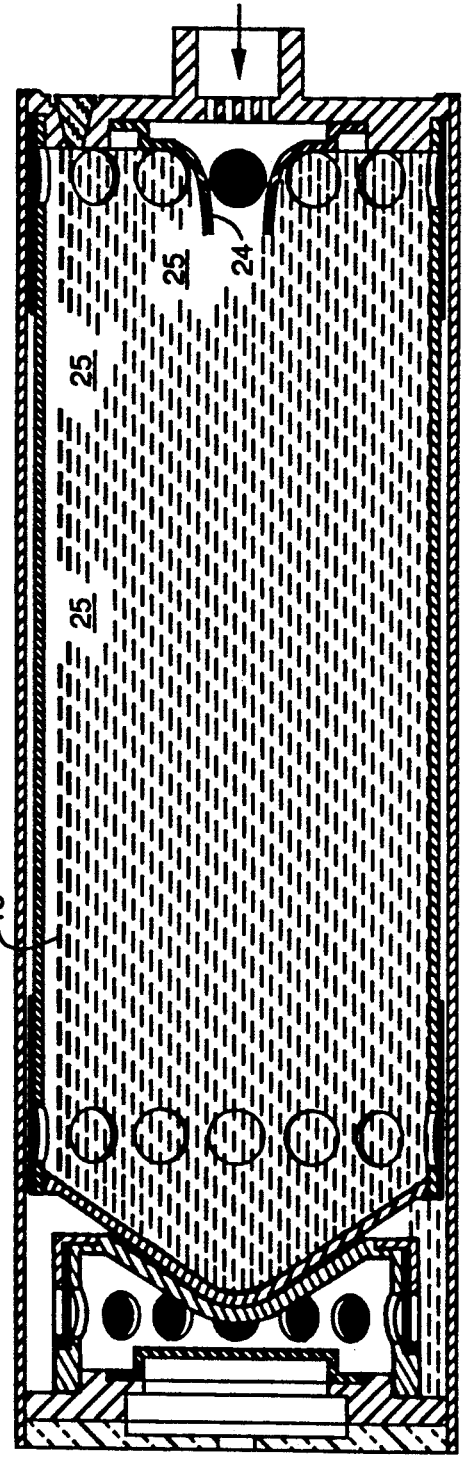

BATTERY WITH SEPARATE ELECTROLYTE STORAGE TANK

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to a battery with a separate electrolyte storage tank, particularly a tank which can discharge the electrolyte to a battery without employing a mechanical expulsion system.

2. Prior Art

Batteries required to be dormant for extended periods of time (up to one or more years) prior to operation are suitably designed with an electrolyte reservoir or tank separate from the battery cell or cells. The battery is then activated by expelling the electrolyte from the tank into the cell or cells. Positive expulsion systems employing gas-driven pistons or bellows, may be costly, unreliable or both. An electrolyte management system for such tank, that is uncomplex and reliable is needed.

There has now been discovered such a system which employs a surface tension electrolyte tank which (1) allows electrolyte to be expelled by a pressurizing gas from such tank; (2) excludes the pressurizing gas from the battery cell and (3) retains the electrolyte in the battery cell under adverse acceleration fields. That is, as described below, the invention employs a liquid-coated barrier screen which permits the passage of electrolyte therethrough while blocking or containing such gas.

The prior art describes the use of porous liquid surface tension gas barriers in batteries. Thus U.S. Pat. No. 4,565,749 to van Ommering et.al. (1986) discloses a bipolar metal-gas battery cell stack in which a hydrophobic barrier is utilized to prevent intercell migration of electrolyte and secondary gases U.S. Pat. No. 4,543,303 to Dantowitz et.al. (1985) discloses batteries containing a plurality of electrochemical fuel cells in which the cathode side outlet of each cell includes cell water/gas separator elements which remove the product water from the outlet gas stream. Each separator includes a hydrophilic, porous matrix, which when wetted will permit the flow of liquid but not the passage of gas therethrough below a certain critical pressure level, normally identified as the "bubble pressure", which is related to pore size and surface tension of the liquid imbibed in the porous hydrophilic membrane.

U.S. Pat. No. 4,514,474 Momyer et.al. (1985) describes an air cathode structure for use in primary batteries. The structure includes a porous separator which is wetted with electrolyte and maintains a high bubble pressure to effectively preclude air from percolating through the separator into the electrolyte.

None of the above references suggest the use of such surface tension gas barrier for separate electrolyte storage and subsequent gas discharge of electrolyte therethrough into the battery cell while excluding the presurizing gas from such battery cell.

SUMMARY OF THE INVENTION

Broadly, the present invention provides a battery of extended shelf life having an electrolyte storage tank that is separate from the battery cell but connected by a conduit therebetween, with means to expel the electrolyte from the tank through the conduit to the cell when desired, the improvement comprising; an openable seal which blocks the conduit, a surface tension barrier which permits liquid flow therethrough while substantially excluding gas flow therethrough and means to apply gas to the tank at a sufficient pressure to push the electrolyte in the tank through the barrier and against such seal to open same so as to expel the electrolyte from the tank and into the cell while substantially excluding the passage of such gas into such cell.

In another embodiment, the present invention provides a tubular electrolyte storage tank mounted concentrically within a larger tubular tank, to define an annulus therebetween, the inner storage tank having an inlet port covered by a gas burstable diaphragm and a plurality of electrolyte outlet ports covered with gas barrier screens which communicate with such annulus. The outer tube has, at a location remote from the gas inlet port, an electrolyte outlet port or conduit which leads to a battery cell (or cells), which outlet port is blocked downstream by a liquid burst diaphragm, such outlet port, upstream of the diaphragm being enclosed by a conduit cover which has apertures therein which communicate with such annulus and which are covered by electrolyte-admitting, gas-excluding, screens, similar to those in the inner electrolyte tube or tank, such that upon application of gas through the inlet port of the electrolyte tank, the gas diaphragm bursts and the inrushing gas drives the electrolyte through the screened outlet ports into the annulus and then through the screened ports of the conduit cover, to burst the outlet port liquid diaphragm and charge the electrolyte into the battery cell while excluding the expelling gas therefrom and containing such gas behind such barrier screens and principally in the inner storage tank.

BRIEF DESCRIPTION OF THE DRAWINGS

The invention will become more apparent from the following details, specifications and drawings;

FIGS. 3, 4, 5 and 6 are elevation views of the tank assembly of FIG. 1 in operation

DESCRIPTION OF PREFERRED EMBODIMENT

Figure 1:
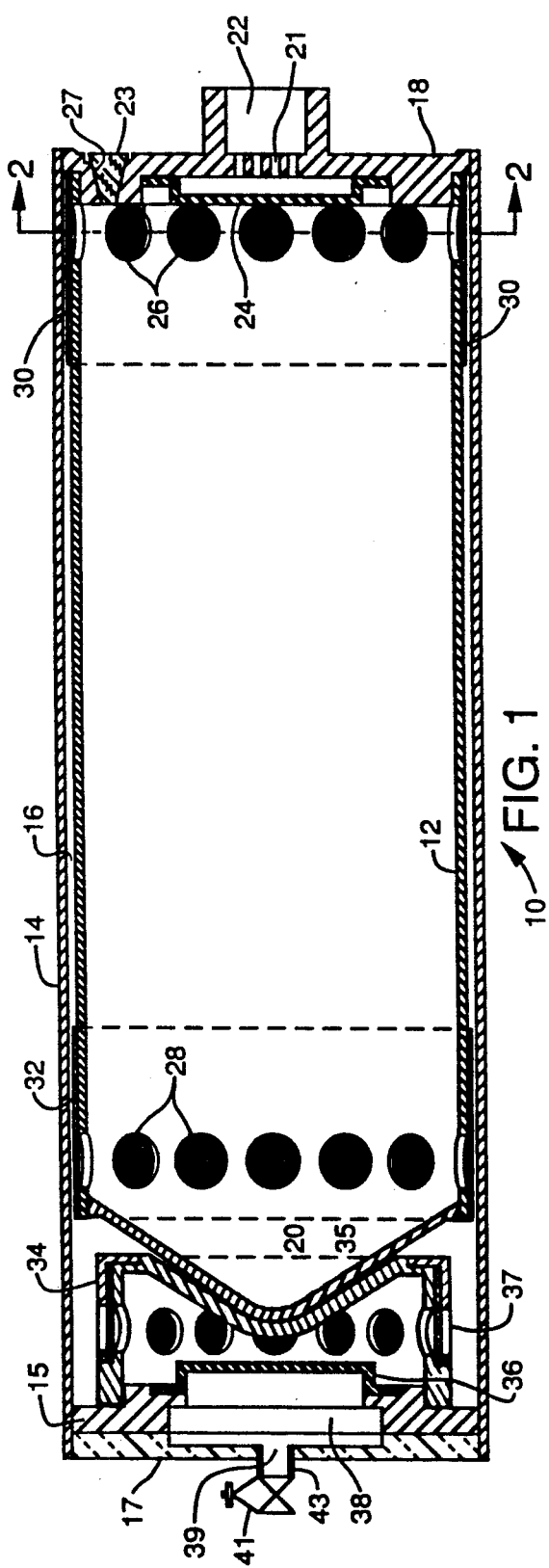
FIG. 1 is a sectional elevation view of the surface tension electrolyte storage tank embodying the present invention.
Figure 2:
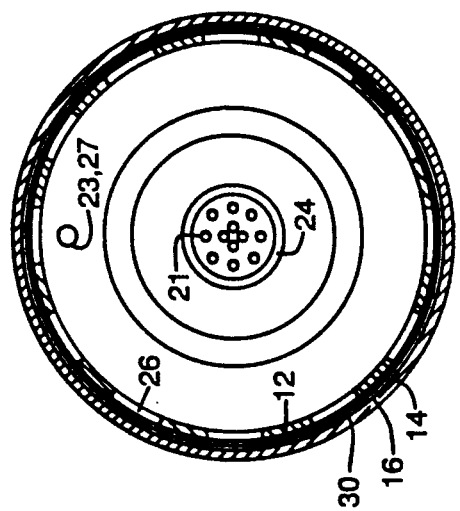
FIG. 2 is a cross-sectional elevation of the tank assembly of FIG. 1, taken on lines 2—2, looking in the direction of the arrows.

Referring in more detail to the drawings, tank assembly 10 includes inner storage tank 12 and outer concentric tube 14, which tank and tube define an annulus 16 therebetween, as shown in FIG. 1 and shown in part in FIG. 2. The storage tank 12 also has a conical nose portion 20 at one end and a wall 18 at the other end, with passages 22 and 23 therethrough, blocked by an gas inlet burstable diaphragm 24, as shown in FIGS. 1 and 2. Such storage tank 12 also has electrolyte outflow apertures 26 and 28, which communicate with the annulus 16, which are covered by fine mesh screens 30 and 32, as shown in FIG. 1.

Figure 7:
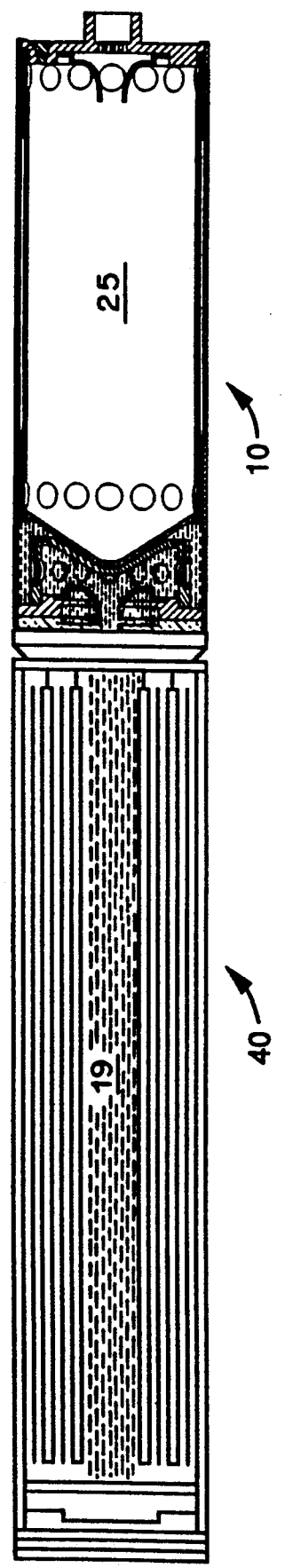
FIG. 7 is a sectional elevation view of the tank assembly of FIG. 1 in combination with a battery

Contoured to fit in nesting engagement with the nose cone 20 of the electrolyte storage tank 12, is conduit outlet cover 34 which fits over electrolyte outlet burstable diaphragm 36, which covers in turn, electrolyte outlet ports 38 and 39, shown in FIG. 1, which communicate with battery assembly 40 as shown in FIG. 7. The outlet 38 is positioned in a recessed end wall 15, of the outer tube 14, while the outlet port 39 is positioned within an insulating plug 17, adjacent such end wall 15 as shown in FIG. 1.

The electrolyte outlet cover 34 has a plurality of outflow apertures 35 covered by a fine mesh screen 37, as shown in FIG. 1. Accordingly, screened outlet ports 26 and 28, define a primary liquid surface tension, gas barrier while screened apertures 35 define a secondary liquid surface tension, gas barrier through which the electrolyte from the storage tank 12 must flow before leaving the tank assembly 10 by way of outlet ports 38 and 39, shown in FIG. 1 and thence to the battery 40 shown in FIG. 7.

In operation, electrolyte 19 is, added to the inner storage tank 10 through fill port 27, which is then sealed with plug 23, as indicated in FIGS. 1 and 3. The electrolyte is filled nearly to the top of the storage tank leaving a ullage (vapor) space thereabove. That is, ullage space is provided in the tank 10, as shown in FIG. 3, to leave room for electrolyte expansion and upon charging the gas into such tank 10 per FIG. 4, such ullage space fills with electrolyte. Such inner tank is also known as the primary ullage compartment or PUC.

The storage tank 10 and battery 40, shown in FIG. 7, form a dormant battery system which can be attached to an aircraft or ground power supply and rest dormant for weeks, months or years. To activate this system, a gas tank (not shown) of compressed helium, can be activated to charge the gas through storage tank inlet ports 22 and 23 and against the gas diaphragm 24 to burst the same and charge gas into the electrolyte inner storage tank 12, to drive the electrolyte 19 out the screened outlet ports 28 and 26 into the annulus 16, between the tanks or tubes 12 and 14 and thence to the electrolyte outlet cover 34, through the screened outlet ports 35 thereof and against the outlet diaphragm 36, to burst same and discharge the electrolyte through the outlet ports 38 and 39, as shown in FIGS. 4, 5 and 6, to expel such electrolyte into the battery 40, shown in FIG. 7.

Figure 5:
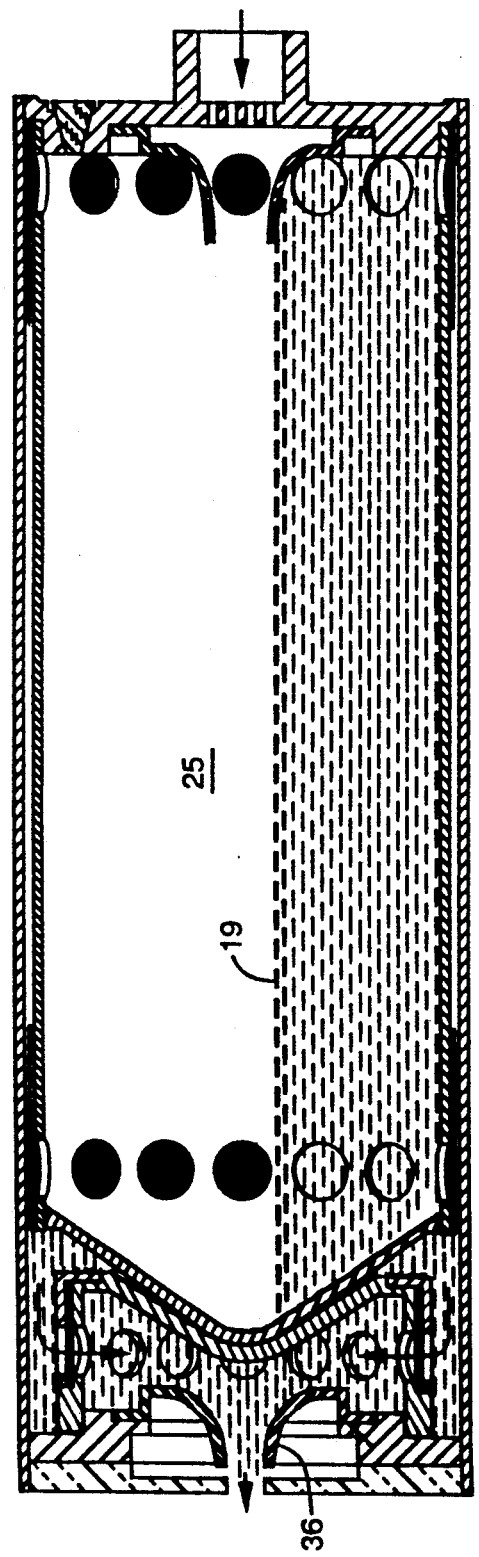
Figure 6:
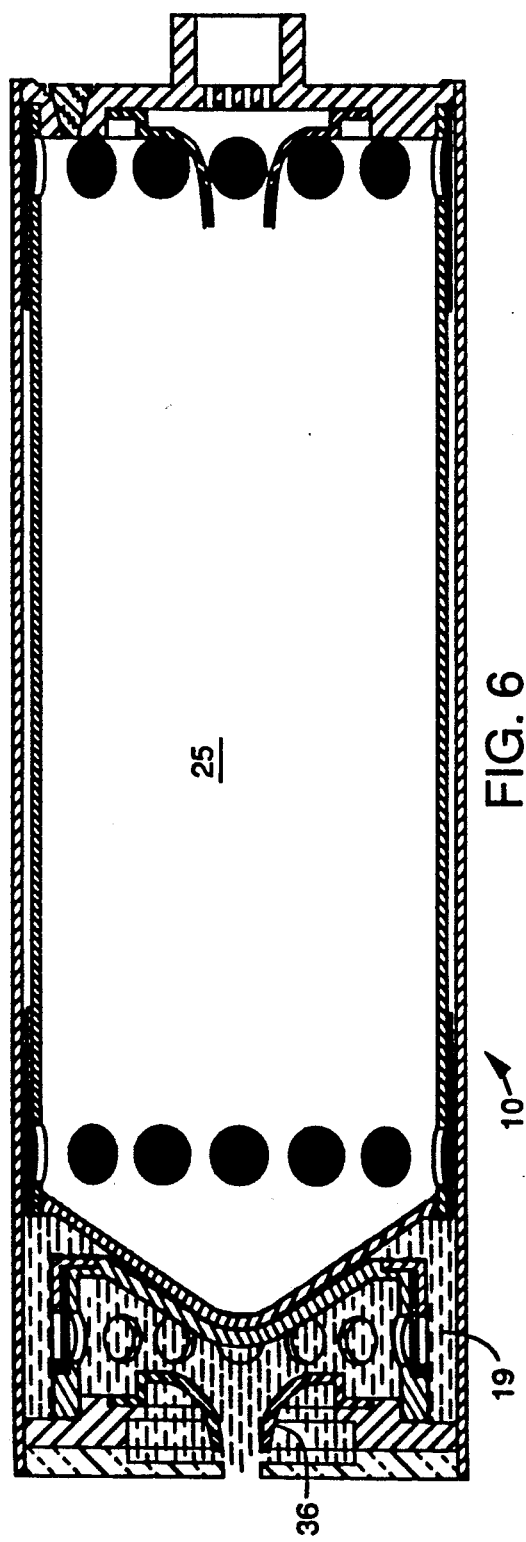

The electrolyte meanwhile has formed a film barrier on such screens 30, 32 and 37 by adhering thereto and forming menisci in the interstices thereof to admit electrolyte therethrough but block the expulsion gas, e.g. helium, so that it remains behind in the storage tank 12, as indicated in FIGS. 5 and 6. Any gas that bubbles past the barrier screens 26 and 28 may well be stopped or excluded at the barrier screen 37 of the outlet cover 34 shown in FIG. 1.

Gas bubbles will only penetrate the above battery screens when the pressure drop across such screens exceeds the bubble point pressure drop of such screens; i.e. only when $\Delta P$ exceeds $\Delta P_{bubble\ point}$ of the screen. A recommended screen size for the barrier screens of the present invention is 325×2300 mesh, eg. in a stainless steel screen, which is readily commercially available and which provides a stable gas/liquid barrier for up to 26 in. $H_2O$ (0.94 psi) $\Delta P$. This screen provides openings of about 5 um. Other screen mesh sizes can be employed within the scope of the invention, the mesh size depending upon the pressure drop across such screens and the electrolyte employed therein. For example, for an earthbound installation, where the pressure drop might normally be lower than in a spacecraft, a larger screen size can be employed, e.g. one at up to 10 microns or more. If there is an indication that gas bubbles will penetrate the barrier screen, certain corrective steps can be taken, eg. (1) employ a reduced expulsion gas pressure (though this can delay the battery activation), (2) employ barrier screens of still smaller mesh (but these are expensive), (3) increase the cross-sectional width of the annulus or (4) reduce the screen pressure drop by reducing the rate of outflow of electrolyte at the outlet port 39, e.g. by installation of valve 41 in an outlet line 33, as shown in FIG. 1 or by installing an outlet port 39 of reduced size.

The above choices are examples of steps that can be taken to keep the pressure drop across the barrier screens below that of the bubble point of the expulsion gas employed, such bubble point being when the gas pressure drop overcomes the surface tension forces of the electrolyte in the barrier screen. To prevent such gas bubble penetration as noted above, one can decrease such pressure drop or increase the $\Delta P$ bubble point of the screen by employing screens of smaller mesh size as noted above.

The reason for the first and second sets of barrier screens is as follows. It is desirable to expel substantially all the electrolyte from the inner storage tank (PUC) 12, which can result in some gas bubbles passing through the first set of barrier screened ports 26 and 28. As such tank empties and as the liquid film on the barrier screens 26 and 28 lessens, such bubbles flow into the annulus 16, shown in FIG. 1. The bubbles then encounter less pressure in the annulus as they flow toward the outlet cap 34 and they are then stopped by the second set of barrier screens 37, which remain well wetted with electrolyte and in a reduced pressure zone.

Within the scope of the invention, it would be possible to dispense with the second set of barrier screens and just employ the barrier screens and electrolyte outlets 26 and 28, provided a small amount of electrolyte was not expelled from the tank 12 so that such barrier screens 26 and 28 remain sufficiently wetted and the pressure drop across such screens were kept sufficiently low, i.e. below the gas bubble point, to block passage of most or all gas bubbles therethrough.

In either case however, the trapped gas in the storage tank 12 provides backflow buffering and serves to prevent the return of all or virtually all the so-expelled electrolyte to such tank.

The annulus between the two tanks 12 and 14 is sized for maximum electrolyte expulsion efficiency. That is, if the annulus be too small in cross-section, the flow rate of the expelled electrolyte will be too high resulting in too large a pressure drop across the barrier screens, e.g. screens 30 and 32 and gas bubbles will be pulled therethrough well before the tank is nearly emptied and while the pressure drop across the secondary barrier screens 37 is still high enough to permit bubble pass-through at such screens into the battery. If the annulus, e.g. annulus 16, be too large then a considerable amount of electrolyte will remain therein after gas expulsion of electrolyte from the PUC tank is completed, ie. the electrolyte expulsion efficiency will be reduced. Accordingly, the inner and outer tanks are sized to provide as small an annulus as possible consistent with avoiding an excessive pressure drop across the PUC barrier screens.

The battery storage tank or PUC and its outer concentric shell can take various shapes beside tubular, e.g. cylindrical, rounded, angular or a combination thereof provided there is an annular passageway between the tanks around or part way around, the inner tank.

The PUC and outlet cover electrolyte ports can be rounded, angular or a combination thereof including slots and located on the PUC and cover at, any locations desired, within the scope of the present invention. Preferably, however, such apertures are located at the ends of the PUC and around the sides of the outlet cover, e.g. as shown in FIG. 1. However, in the case of the PUC, 1, 2 or more rows of such outlet apertures, covered by a porous barrier, can be employed according to the present invention.

Such porous barrier can be a screen of suitable mesh size or can be a perforated metal sheet, e.g. with laser drilled holes, sized as desired, within the scope of the invention.

Such screens and other tank components can be of various metals but preferably, in the case of electrolyte, due to its corrosive nature, are of stainless steel for durability.

In FIG. 7 is illustrated a battery storage tank and one cell of a battery. Although one such battery assembly can be employed per the present invention, often a plurality of such batteries hooked in series or parallel or a combination thereof, are employed. Thus in certain space applications, clusters of over 50 of such battery assemblies, each with its own separate electrolyte storage tank are employed.

In certain applications including space vehicle applications, an electrolyte expulsion time from the storage tank of between 4 to 6 seconds is desired so that one or a plurality of batteries can be activated in, e.g. between 5–6 seconds. In other applications the required expulsion time is lower. Such required expulsion time will govern the gas pressure applied in the PUC but the pressure drop across the barrier screens, particularly at the secondary barrier screen in the cover over the conduit outlet, must not exceed the bubble point of the gas through such screens, e.g. not over 26 inches of $H_2O$. However, these parameters are attainable with the electrolyte storage tank of the invention, e.g. as shown in the drawings.

The separate electrolyte storage tank of the invention is useful for dormant demand batteries for e.g. spacecraft, aircraft, space vehicles, satellites and on the ground, e.g. emergency ground power supplies.

What is claimed is:

1. A battery of extended shelf-life having an electrolyte storage tank that is separate from the battery cell, but connected by a conduit therebetween, with means to expel the electrolyte from said tank through said conduit to said cell when desired, the improvement comprising; an openable seal which blocks said conduit, a surface tension barrier which permits liquid flow while excluding gas flow, therethrough and means to apply gas to said tank in a sufficient amount to push said electrolyte through said conduit and against said seal, to open same so as to expel said electrolyte from said tank through said barrier and into said cell while substantially excluding the passage of said gas into said cell.

2. The battery of claim 1, having a gas inlet thereto and an openable seal which blocks said inlet, and means to apply gas against said seal to open same so as to charge said gas into said tank and push said electrolyte through said surface tension barrier, through said seal and out of said tank into said battery.

3. The battery of claim 2 wherein an inlet gas diaphragm is the gas seal and an outlet electrolyte diaphragm is the electrolyte outlet seal, both of said diaphragms being burstable under gas or liquid pressure respectively.

4. The battery of claim 1 wherein said surface tension barrier is a screen of fine mesh size that holds a film of electrolyte in the meshes thereof due to surface tension.

5. The battery of claim 4 wherein said surface tension barrier is a screen of mesh $325 \times 2300$ mesh size.

6. The battery of claim 5 wherein said tank has a plurality of apertures therein, which apertures are covered by said screen to define a plurality of surface tension barriers to permit pressurized electrolyte to exit therethrough while blocking substantially all of said gas.

7. The battery of claim 6 wherein the entrance to said conduit is enclosed by a conduit cover having a plurality of apertures therein, which apertures are covered by said screen, which conduit apertures serve as a second surface tension barrier for said electrolyte which, having been expelled through the tank barrier screens is now directed through the conduit cover barrier screens while excluding substantially all expelling gas that may have passed through the tank barrier screens, said electrolyte being then directed at and through the conduit diaphragm and into said battery cell.

8. The battery of claim 7 wherein said tank has two sets of screened apertures which encircle such tank while the conduit cover has one set of screened apertures which encircle such cover.

9. The battery of claim 8 wherein said tank is mounted concentrically within another tank such that the two tanks define an annulus for electrolyte flow so that the electrolyte upon being expelled through such screened apertures, flows down said annulus to and through the screened apertures enclosing said conduit cover.

10. The battery of claim 9 having means to maintain the pressure differential between the inside of the electrolyte tank and said annulus, across said screened apertures, at 26 inches of $H_2O$ or less, to prevent the expelling gas from bubbling through said screens to the annulus and/or through said conduit cover screens and into said conduit.

11. The battery of claim 10 wherein an electrolyte flow control is mounted in said conduit, downstream of said outlet electrolyte diaphragm and conduit cover screen, to control the outflow of electrolyte from said electrolyte tank and thus maintain said pressure drop across said tank screens and/or said conduit cover screens at 26 inches of $H_2O$ or below.

* * * * *